(12) United States Patent
Edwards

(10) Patent No.: US 7,383,560 B2
(45) Date of Patent: Jun. 3, 2008

(54) MULTI-DISK DATA CARTRIDGE

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 509 days.

(21) Appl. No.: 11/038,294

(22) Filed: Jan. 18, 2005

(65) Prior Publication Data

US 2006/0161944 A1    Jul. 20, 2006

(51) Int. Cl.
G11B 23/03    (2006.01)
G11B 3/00    (2006.01)

(52) U.S. Cl. .................. 720/725; 720/728; 369/176

(58) Field of Classification Search ............... 720/725, 720/728, 732; 369/176, 178, 196, 197, 206, 369/30.64, 30.76, 30.77, 30.78, 30.83; 312/72, 312/9.9, 9.64, 284; 360/38.04, 98.04
See application file for complete search history.

(56) References Cited

U.S. PATENT DOCUMENTS

| | | | | |
|---|---|---|---|---|
| 1,429,052 A | * | 9/1922 | Ward ........................ | 312/9.43 |
| 4,109,919 A | | 8/1978 | Elliott et al. | |
| 4,138,703 A | | 2/1979 | Stave et al. | |
| 4,463,849 A | | 8/1984 | Prusak et al. | |
| 4,819,114 A | | 4/1989 | Bernitt et al. | |
| 4,885,652 A | | 12/1989 | Leonard et al. | |
| 5,062,092 A | * | 10/1991 | Siryj et al. ............... | 369/30.75 |
| 5,063,553 A | * | 11/1991 | Suzuki et al. ............. | 369/30.78 |
| 5,093,818 A | * | 3/1992 | Suzuki .................... | 369/30.83 |
| 5,099,466 A | * | 3/1992 | Kimura et al. ........... | 369/30.81 |
| 5,210,728 A | * | 5/1993 | Noguchi et al. .......... | 369/30.78 |
| 5,212,683 A | | 5/1993 | Van Heusden et al. | |
| 5,253,246 A | * | 10/1993 | Leonhardt et al. .......... | 720/725 |
| 5,309,421 A | * | 5/1994 | Fujisawa .................... | 720/635 |
| 5,491,596 A | * | 2/1996 | Kobori .................... | 360/97.03 |
| 5,570,252 A | | 10/1996 | Sumner et al. | |
| 5,581,540 A | * | 12/1996 | Dang ........................ | 720/729 |
| D378,518 S | | 3/1997 | Sumner et al. | |
| 5,610,891 A | | 3/1997 | Choi | |
| 5,612,940 A | | 3/1997 | Otsuka et al. | |
| 5,631,893 A | | 5/1997 | Kang et al. | |

(Continued)

FOREIGN PATENT DOCUMENTS

EP    0 721 187 A2    7/1996

(Continued)

*Primary Examiner*—Andrea Wellington
*Assistant Examiner*—Jason M. Garr
(74) *Attorney, Agent, or Firm*—Eric D. Levinson

(57) ABSTRACT

The invention is directed to data cartridges including a plurality of data storage disks. The invention applies the multi-disk data cartridges to a "jukebox" system in which one of the data cartridges is inserted into a computing device that de-cartridges and positions the data storage disks on one or more disk drives for reading or recording. A multi-disk data cartridge may comprise a cartridge housing with dimensions that conform to a magnetic tape cartridge housing standard form factor. The data cartridges may include blue disk media, such as Blu-Ray and HD-DVD. In order to integrate blue disk media into the data cartridge described herein, the blue disk media may comprise dimensions that conform to a non-standard blue disk form factor. In other cases, a cartridge housing may conform to a non-standard form factor based on dimensions of a standard form factor blue disk.

17 Claims, 9 Drawing Sheets

U.S. PATENT DOCUMENTS

| | | | | |
|---|---|---|---|---|
| 5,636,095 | A | 6/1997 | McGrath et al. | |
| 5,671,109 | A | 9/1997 | Sumner et al. | |
| 5,680,276 | A | 10/1997 | Takekado | |
| 5,691,860 | A | 11/1997 | Hoppe | |
| 5,694,278 | A | 12/1997 | Sumner | |
| 5,715,233 | A | 2/1998 | Yoshida et al. | |
| 5,724,332 | A | 3/1998 | Ogusu | |
| 5,777,956 | A * | 7/1998 | Nakamichi | 369/30.77 |
| 5,862,109 | A * | 1/1999 | Nakamichi | 369/30.85 |
| 5,903,538 | A * | 5/1999 | Fujita et al. | 369/30.76 |
| 5,923,630 | A | 7/1999 | Yoshida et al. | |
| 5,936,935 | A * | 8/1999 | Hanakawa et al. | 720/732 |
| 6,009,060 | A * | 12/1999 | Kim | 720/603 |
| 6,175,544 | B1 * | 1/2001 | Shiomi | 720/674 |
| 6,206,313 | B1 * | 3/2001 | Rudi | 242/341 |
| 6,215,760 | B1 * | 4/2001 | Hanakawa et al. | 720/733 |
| 6,243,350 | B1 | 6/2001 | Knight et al. | |
| 6,345,032 | B1 * | 2/2002 | Kikuchi | 720/725 |
| 6,359,853 | B1 * | 3/2002 | Nakamichi | 369/178.01 |
| 6,407,982 | B1 * | 6/2002 | Aoki et al. | 720/733 |
| 6,661,745 | B1 * | 12/2003 | Tominaga et al. | 369/13.33 |
| 6,848,113 | B2 * | 1/2005 | Klein | 720/619 |
| 6,904,605 | B2 * | 6/2005 | Platte et al. | 720/619 |
| 7,047,538 | B2 * | 5/2006 | Sato et al. | 720/619 |
| 7,082,611 | B2 * | 7/2006 | Miike | 720/736 |
| 2001/0006503 | A1 * | 7/2001 | Braitberg et al. | 369/77.2 |
| 2002/0006103 | A1 * | 1/2002 | Duroj | 369/273 |
| 2002/0131198 | A1 * | 9/2002 | Kim | 360/96.5 |
| 2002/0167890 | A2 * | 11/2002 | Duroj | 369/273 |
| 2002/0180317 | A1 * | 12/2002 | Byrne | 312/9.46 |
| 2003/0095491 | A1 * | 5/2003 | Adachi et al. | 369/77.1 |
| 2003/0135672 | A1 * | 7/2003 | Yip et al. | 710/72 |
| 2003/0142618 | A1 * | 7/2003 | Burnett | 369/272 |
| 2005/0077409 | A1 * | 4/2005 | Brown et al. | 242/348 |
| 2005/0125815 | A1 * | 6/2005 | Klein | 720/619 |
| 2005/0240953 | A1 * | 10/2005 | Awano | 720/670 |
| 2006/0005217 | A1 * | 1/2006 | Leonhardt et al. | 720/725 |
| 2006/0048170 | A1 * | 3/2006 | Lin | 720/619 |
| 2006/0090175 | A1 * | 4/2006 | Kuo | 720/619 |
| 2006/0101482 | A1 * | 5/2006 | Awano et al. | 720/695 |
| 2006/0136950 | A1 * | 6/2006 | Eberdorfer | 720/652 |
| 2006/0179445 | A1 * | 8/2006 | Russ | 720/619 |

FOREIGN PATENT DOCUMENTS

| | | |
|---|---|---|
| GB | 2 228 818 | 9/1990 |
| JP | 60124076 | 7/1985 |
| JP | 62031079 | 2/1987 |
| JP | 62-234282 | 10/1987 |
| JP | 5-334848 | 12/1993 |
| JP | 06076522 | 3/1994 |
| JP | 07244950 | 9/1995 |
| JP | 07262729 | 10/1995 |
| JP | 10-269737 | 10/1998 |
| JP | 10-320952 | 12/1998 |
| JP | 10-334630 | 12/1998 |
| WO | 88/09553 | 12/1988 |
| WO | 94/11873 | 5/1994 |
| WO | WO 2004/109671 | * 12/2004 |

* cited by examiner

MULTI-DISK DATA CARTRIDGE

TECHNICAL FIELD

The invention relates to data storage systems and, more particularly, to cartridge library storage systems.

BACKGROUND

Automated cartridge libraries provide access to vast amounts of electronic data by managing data cartridges. Automated cartridge libraries exist in all sizes, ranging from small library systems that may provide access to twenty or fewer data cartridges, to larger library systems that may provide access to thousands of data cartridges. In a conventional automated cartridge library system, an automation unit, such as a robotic arm or other mechanism, selectively retrieves a data cartridge from a storage location and loads the retrieved data cartridge into a designated drive to access data stored by the data cartridge.

A conventional data cartridge includes a tape with a magnetic recording layer wound on one or more reels or hubs. Examples of various magnetic tape cartridges include digital linear tape (DLT) cartridges, linear tape-open (LTO) cartridges, 9840 cartridges, and 9940 cartridges. Each of the various types of magnetic tape cartridges may conform to a different form factor. A tape drive of the library system typically has a substantially similar, if not identical, form factor to receive the magnetic tape cartridges. Magnetic tape cartridges are available from several manufacturers including Imation Corp. of Oakdale, Minn., and StorageTek of Louisville, Colo.

SUMMARY

In general, the invention is directed to data cartridges including a plurality of data storage disks. The invention applies the multi-disk data cartridges to a "jukebox" system in which one of the data cartridges is inserted into a computing device that de-cartridges the data storage disks and positions the disks on one or more disk drives for reading or recording.

A multi-disk data cartridge may comprise a cartridge housing with dimensions that conform to a magnetic tape cartridge housing standard form factor. In this way, the multi-disk data cartridges can be made to be backward compatible with magnetic tape cartridge library handling systems. The invention may be applied as a tape cartridge library replacement where rapid access and media archive does not require tape maintenance.

Furthermore, the invention may be directed to data cartridges that include blue disk media, i.e., optical disk media compatible with a blue-laser drive head. As used herein, the term blue disk media (or blue disks) refers to optical disk media having a data storage capacity of greater than 15 gigabyte (GB) per data storage layer of the disk. Examples of blue disk media include Blu-Ray and HD-DVD, but other future generations of optical disks may also comprise blue disk media. Conventional CDs and DVDs having storage capacity less than 5 GB and magneto-optical (MO) disks having storage capacity of approximately 9 GB are not blue disk media, as used herein.

A data cartridge may include one or more blue disks that conform in format, but utilize non-standard physical media thickness. In this case, the thinner media constructions enable more data bearing surfaces to be contained within each individual data cartridge. Blue disk media formats are typically constructed, for example, in constructions of 1.2 mm in total thickness, but samples based on 0.6 mm substrate thickness have proven functionally equivalent in blue disk drive testing. Media thickness of less than approximately 1.2 mm or even less than approximately 0.6 mm provides greater data capacity in the multi-disk cartridge application.

A data cartridge may include one or more blue disks that do not include cover layers. In this case, a corresponding disk drive within a computing device may comprise an objective lens and a cover layer affixed adjacent the objective lens to focus a light onto a surface of the blue disk when extracted from the data cartridge. In some cases, in order to integrate blue disk media into the data cartridge described herein, the blue disk media may comprise dimensions that conform to a non-standard blue disk form factor. In other cases, standard form factor blue disks may be included in a cartridge housing with dimensions that conform to a non-standard cartridge housing form factor.

In one embodiment, the invention is directed to a data cartridge comprising a cartridge housing, and a plurality of data storage disks stacked in the cartridge housing. The cartridge housing is configured to be opened by a computing device when the data cartridge is inserted into the computing device so that the computing device can access the plurality of data storage disks. In order to provide increased environmental protection, the cartridge housing may be sealed and designed such that it may only be opened by the computing device when the data cartridge is inserted into the computing device. In some cases, a spindle is included as an element of the cartridge housing and the plurality of disks are stacked on the spindle within the cartridge housing. In this case, the spindle portion of the cartridge housing may be extracted by the computing device for access to the spindled disks.

In another embodiment, the invention is directed to a method comprising receiving a data cartridge within a computing device, wherein a housing of the data cartridge includes a spindle with a plurality of data storage disks stacked on the spindle. The method further comprises opening the cartridge housing to expose the spindled data storage disks, and unspindling the plurality of data storage disks onto one or more data storage disk drive stations or into a randomly accessible jukebox mechanism.

In another embodiment, the invention is directed to a system comprising a data cartridge with a cartridge housing that includes a blue disk without a cover layer, and a computing device that receives the data cartridge and opens the cartridge housing to expose the blue disk. The system also comprises a blue disk drive within the computing device that includes an objective lens and a cover layer positioned adjacent the objective lens, wherein the objective lens focuses a light onto a surface of the blue disk via the adjacent cover layer.

The invention is capable of providing one or more advantages. Blue disks included in a data cartridge, as described herein, may comprise 1-layer, 2-layer, 4-layer, or 8-layer blue disks in accord with migration of media multi-layer technology. As an example, blue disks conforming to the Blu-Ray format a real density but made with non-conforming media thickness of 0.6 mm and non-conforming media diameters to accommodate and LTO data cartridge dimension can generate respective cartridge capacity projections of 250 GB, 500 GB, 1 TB, and 2 TB while maintaining 0.55 mm spacing between disks in the cartridge. Decreasing the media spacing between cartridges increases the cartridge capacity at the risk of media robustness in cartridge drop-testing. Therefore, the multi-disk data cartridges may provide capacities approaching that of magnetic tape data cartridges with reduced access time to the stored data. In some cases, a computing device of the multi-disk cartridge library system may include multiple disk drives to increase the drive data transfer rate. Furthermore, the plurality of data storage disks within the data cartridge share the additional cost-per-disk associated with conventional single disk cartridges.

Moreover, by affixing a cover layer adjacent an objective lens of a disk drive, blue disks can have a thinner profile. This can allow additional blue disks to be included within a cartridge housing form factor. In addition, sealing the blue disks without cover layers in a data cartridge protects the blue disk media surfaces from contamination while circumventing one of the largest yield loss steps of a conventional blue disk media fabrication process. Current yield reports for bonding cover layers to blue disk media are only approximately 50%-60%. Thus, eliminating the need for a cover layer can both reduce the thickness of the disks, which allows more disks to be stored in a given cartridge volume, and simplify manufacturing of the disks.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
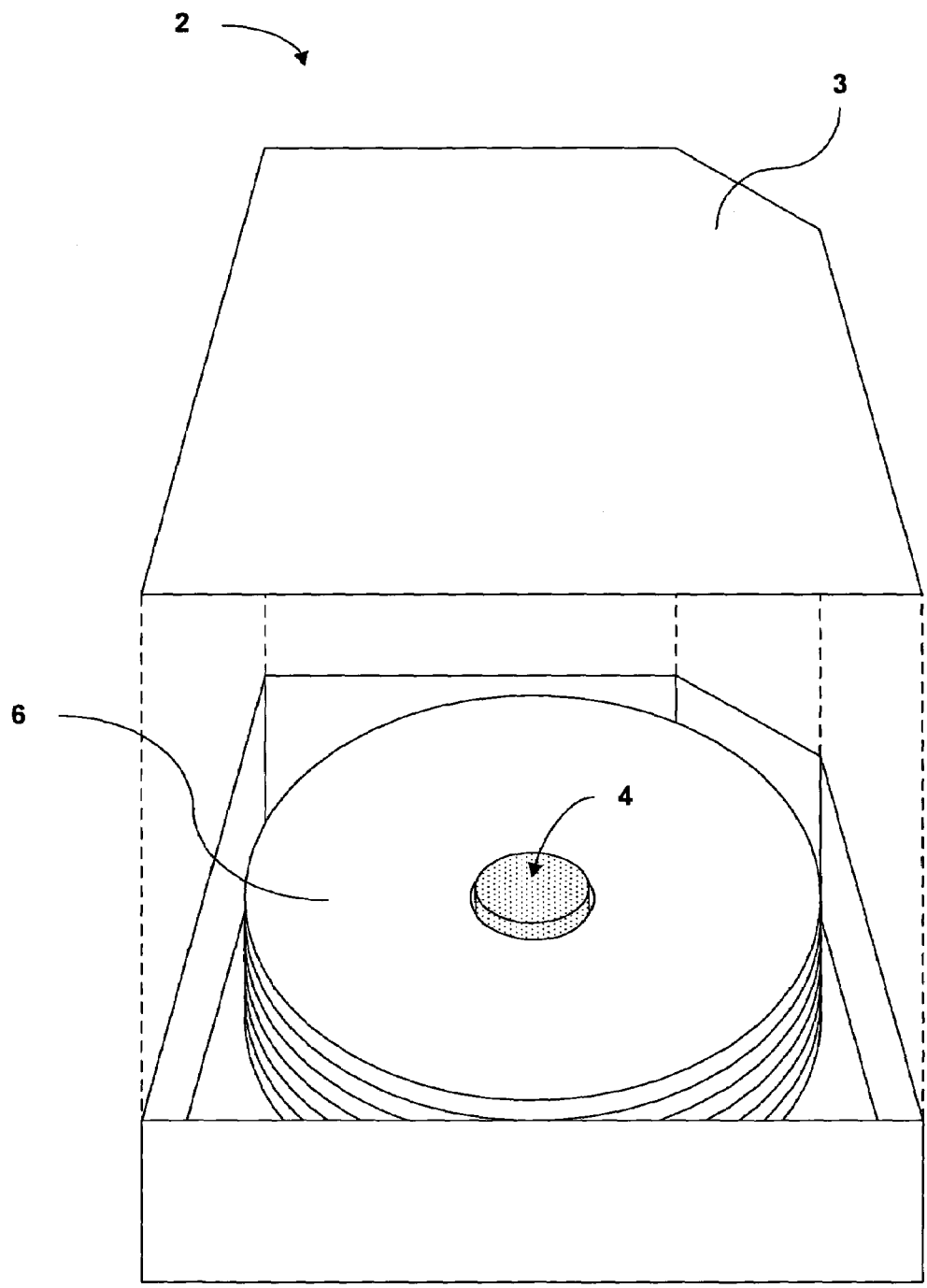
FIG. 1 is a schematic diagram illustrating an exploded view of an exemplary data storage disk cartridge.

FIG. 1 is a schematic diagram illustrating an exploded view of an exemplary data storage disk cartridge 2. Data cartridge 2 includes a spindle 4 on which a plurality of data storage disks 6 may be stacked. As described herein, multi-disk data cartridge 2 may be applied to a "jukebox" system in which data cartridge 2 is inserted into a computing device (not shown) that unspindles data storage disks 6 from spindle 4 and positions the disks on one or more disk drives within the computing device or into a randomly accessible jukebox mechanism. The disk drives may then read data from data storage disks 6 or record data to data storage disks 6.

Conventional single disk cartridges could enable automated single disk handling in data cartridge library systems and protect the optical media surface from contamination. However, the additional cost-per-disk associated with the single disk cartridges may prevent wide usage in consumer markets. A multi-disk cartridge, as described herein, shares the cost-per-disk with the quantity of spindled data storage disks.

Data cartridge 2 may comprise a cartridge housing 3 with dimensions that conform to a magnetic tape cartridge housing standard form factor. For example, cartridge housing 3 may conform to a 9940 cartridge form factor, a linear tape-open (LTO) cartridge form factor, a digital linear tape (DLT) cartridge form factor, or another tape cartridge form factor. In addition, cartridge housing 3 may include indents and other physical features substantially similar to a conventional tape cartridge housing. In this way, multi-disk data cartridge 2 may be backward compatible for installation in magnetic tape cartridge library systems. If desired, however, a feature or element may be included on housing 3 or formed in housing 3 to distinguish the cartridge from conventional tape cartridges, e.g., for automated handing.

In other embodiments, cartridge housing 3 may comprise dimensions large enough to enclose data storage disks 6 that substantially conform to a form factor of a standard data storage disk diameter. A standard data storage disk form factor is typically larger than a standard tape cartridge housing form factor, such as those listed above. Therefore, in some cases, data storage disks 6 may conform to a non-standard form factor in order to fit within a standard form factor cartridge housing. In other cases, cartridge housing 3 may conform to a non-standard tape cartridge form factor in order to carry standard form factor data storage disks.

As an example, data storage disks 6 may comprise optical storage media, such as holographic media or blue disk media, i.e., optical disk media compatible with a blue-laser drive head. As used herein, the term blue disk media (or blue disks) refers to optical disk media having a data storage capacity of greater than 15 GB per data storage layer. Conventional CDs and DVDs having storage capacity less than 5 GB and magneto-optical (MO) disks having storage capacity of approximately 9 GB are not blue disk media, as used herein. Blue disk media formats currently under development for standardized optical products include Blu-Ray and HD-DVD, which are in competition for the next generation of optical business, but other future generations of optical disks may also comprise blue disks. Both blue media formats conform to a substantially similar form factor. However, the formats comprise substantially different media constructions in that the HD-DVD format uses a cover layer with a different thickness than a cover layer used by the Blu-Ray format. The blue media formats, therefore, require substantially different optical disk drives to focus a light onto a surface or onto multiple surfaces (i.e., for multi-layer) of the blue disk.

In some cases, data storage disks 6 may comprise blue disks that do not include cover layers, i.e., an air-incident media construction. In this case, a corresponding disk drive within the computing device may comprise an objective lens designed for air-incident media. Alternatively, for compatibility with objective lenses designed for a cover-layer media construction, the lens may be retrofitted with a cover layer affixed adjacent the objective lens. The computing device unspindles data storage disks 6 from data cartridge 2 and positions one of data storage disks 6 on the disk drive. The objective lens may then focus light onto a surface of the blue disk via the adjacent cover layer. Removing the cover layer from disks 6 can reduce the thicknesses of data storage disks 6. With the absence of cover layers, data cartridge 2 may carry additional data storage disks 6 within cartridge housing 3. In addition, current cover layer bonding yields are between 50% and 60%. Affixing or otherwise positioning the cover layer to an objective lens of a disk drive allows elimination of one of the largest yield loss step in creating blue disk media.

Figure 2A:
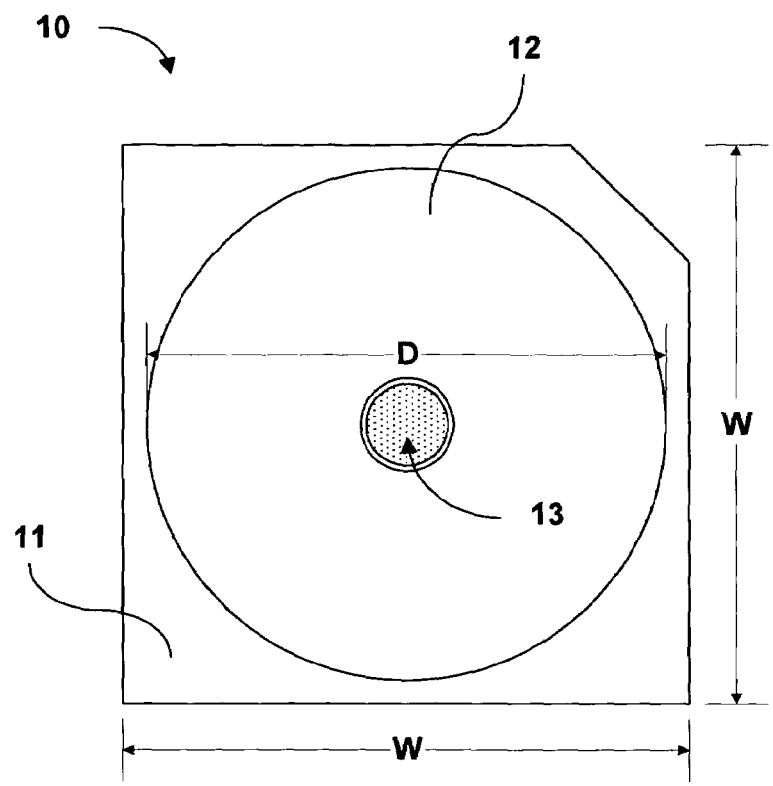
FIG. 2A is a schematic diagram illustrating an exemplary top view of a data storage disk cartridge.
Figure 2B:
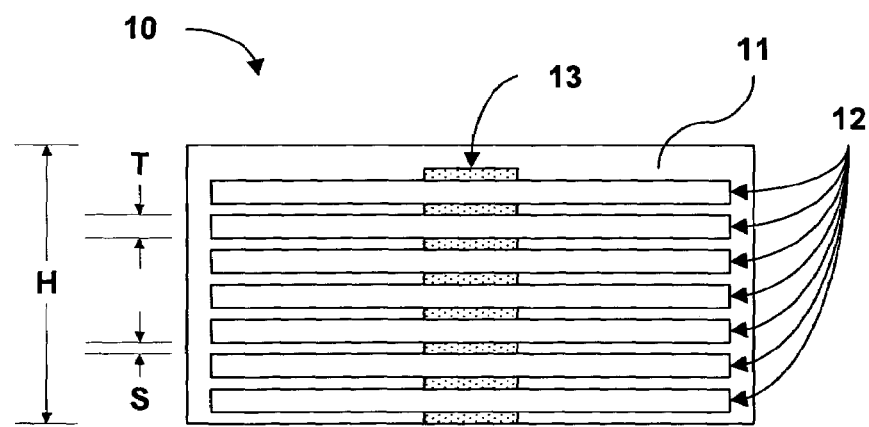
FIG. 2B is a schematic diagram illustrating an exemplary side view of a data storage disk cartridge.

FIG. 2A is a schematic diagram illustrating an exemplary top view of a data storage disk cartridge 10. FIG. 2B is a schematic diagram illustrating an exemplary side view of a data storage disk cartridge 10. As illustrated in FIGS. 2A and 2B, data storage disk cartridge 10 comprises a cartridge housing 11 with a spindle 13. One or more data storage disks 12 are stacked on spindle 13 and enclosed by cartridge housing 11.

In the illustrated embodiment, cartridge housing 11 conforms to a square form factor with a width W. In other embodiments, cartridge housing 11 may comprise a rectangular or another polygon shaped form factor. Data storage disks 12 within cartridge housing 11 conform to a form factor with an outer diameter D. In order to enclose data storage disks 12 in cartridge housing 11, the diameter D of the disks can be made less than the width W of cartridge housing 11. More specifically, the diameter D must be less than an inner width of housing 11 that defines the available area within the housing.

The form factor of cartridge housing 11 also comprises a height H. Data storage disks 12 have a thickness T and are stacked on spindle 13 with a disk-to-disk spacing S. The number of data storage disks 12 that cartridge housing 11 can carry depends upon the height H of cartridge housing 11, the thickness T of data storage disks 12, and the spacing S between disks 12 stacked on spindle 13.

For example, data storage disks 12 may comprise blue disk media. Standard blue disk media formats, e.g., HD-DVD and Blu-Ray, are designed around a 120 mm outer diameter by a 1.2 mm media thickness including a cover layer. The HD-DVD format includes a 0.6 mm incident substrate construction with two substrate elements bonded together to compose a 1.2 mm total media thickness. The Blu-Ray format includes a 0.1 mm cover layer (or cover sheet) construction with the cover layer bonded to a 1.1 mm substrate element to compose a 1.2 mm total media thickness. The current capacity migration projected for the Blu-Ray format, for example, is approximately 25 GB for a 1-layer disk, 50 GB for a 2-layer disk, 100 GB for a 4-layer disk, and 200 GB for an 8-layer disk. In other embodiments, data storage disks 12 may comprise optical media formatted for holographic data storage.

In some cases, cartridge housing 11 may substantially conform to a tape cartridge housing standard form factor. For example, cartridge housing 11 may conform to a 9940 cartridge form factor including an internal width of approximately 104 mm and an internal height of approximately 18 mm. The "internal" dimensions define the area inside the cartridge that can receive and house disks. The "external" dimensions or "outer" dimensions of a 9940 cartridge may be approximately 122 millimeters by 106 millimeters by 24 millimeters. A 9940 cartridge housing format cannot enclose standard form factor blue disks with dimensions as given above. Conformance with tape cartridge housing 11 may require non-standard data storage disk 12 in terms of physical diameter. In addition, the thickness T of data storage disks 12 may be minimized in order to fit a maximum number of disks 12 in cartridge housing 11. However, optical construction of data storage disks 12 preferably follow a standard media construction process in order to assure compatibility with the optical design for the objective lenses commercially available within optical disk drive systems.

For the 9940 cartridge housing format, the outer diameter of data storage disks 12 would optimally be in the range of 100-102 mm. Table 1, shown below, provides an example of a standard 9940 cartridge housing enclosing non-standard Blu-Ray disks with an outer diameter of 100 mm and a thickness of 1.2 mm. Table 1 gives capacities for the 9940 cartridge when carrying up to 12 Blu-Ray disks comprising 1-layer, 2-layer, 4-layer, or 8-layer constructions. In addition, Table 1 also lists the disk-to-disk spacing S within the 9940 cartridge housing for each number of Blu-Ray disks.

TABLE 1

| Disk N | Spacing (mm) | 1-layer (GB) | 2-layer (GB) | 4-layer (GB) | 8-layer (GB) |
|---|---|---|---|---|---|
| 1 | 8.40 | 17.8 | 35.6 | 71.2 | 142.5 |
| 2 | 5.20 | 35.6 | 71.2 | 142.5 | 284.9 |
| 3 | 3.60 | 53.4 | 106.8 | 213.7 | 427.4 |
| 4 | 2.64 | 71.2 | 142.5 | 284.9 | 569.8 |
| 5 | 2.00 | 89 | 178.1 | 356.2 | 712.3 |
| 6 | 1.54 | 106.8 | 213.7 | 427.4 | 854.8 |
| 7 | 1.20 | 124.7 | 249.3 | 498.6 | 997.2 |
| 8 | 0.93 | 142.5 | 284.9 | 569.8 | 1139.7 |
| 9 | 0.72 | 160.3 | 320.5 | 641.1 | 1282.2 |
| 10 | 0.55 | 178.1 | 356.2 | 712.3 | 1424.6 |
| 11 | 0.40 | 195.9 | 391.8 | 783.5 | 1567.1 |
| 12 | 0.28 | 213.7 | 427.4 | 854.8 | 1709.5 |

Table 2, shown below, provides an example of a standard 9940 cartridge housing enclosing non-standard Blu-Ray disks with an outer diameter of 100 mm and a thickness of 0.6 mm. Table 2 gives capacities for the 9940 cartridge when carrying between 10 and 21 Blu-Ray disks comprising 1-layer, 2-layer, 4-layer, or 8-layer constructions. In addition, Table 2 also lists the disk-to-disk spacing S within the 9940 cartridge housing for each number of Blu-Ray disks.

TABLE 2

| Disk N | Spacing (mm) | 1-layer (GB) | 2-layer (GB) | 4-layer (GB) | 8-layer (GB) |
|---|---|---|---|---|---|
| 10 | 1.09 | 178.1 | 356.2 | 712.3 | 1424.6 |
| 11 | 0.95 | 195.9 | 391.8 | 783.5 | 1567.1 |
| 12 | 0.83 | 213.7 | 427.4 | 854.8 | 1709.5 |
| 13 | 0.73 | 231.5 | 463 | 926 | 1852 |
| 14 | 0.64 | 249.3 | 498.6 | 997.2 | 1994.5 |
| 15 | 0.56 | 267.1 | 534.2 | 1068.5 | 2136.9 |
| 16 | 0.49 | 284.9 | 569.8 | 1139.7 | 2279.4 |
| 17 | 0.43 | 302.7 | 605.5 | 1210.9 | 2421.8 |
| 18 | 0.38 | 320.5 | 641.1 | 1282.2 | 2564.3 |
| 19 | 0.33 | 338.3 | 676.7 | 1353.4 | 2706.8 |
| 20 | 0.29 | 356.2 | 712.3 | 1424.6 | 2849.2 |
| 21 | 0.25 | 374 | 747.9 | 1495.8 | 2991.7 |

Tables 1 and 2 above illustrate the motivation for including blue disk media in a data cartridge. For example, including 14 Blu-Ray disks with a thickness of 0.6 mm and 1-layer, 2-layers, 4-layers, and 8-layers into a 9940 cartridge format provides a respective capacity migration of 250 GB, 500 GB, 1 TB, and 2 TB per data cartridge. In this case, the spacing S between the disks and between the disks and cartridge housing is 0.64 mm. Of course, reductions in the spacing between disks enables even greater capacity cartridges in the multi-disk cartridge application. Stacking rings may separate the data storage disks and protect the surfaces of the data storage disks from contacting one another during cartridge handling. The stacking rings may be formed separately, or may be formed as part of the inner diameter of each respective disk.

In other embodiments, cartridge housing 11 may substantially conform to a LTO cartridge form factor including an interior width of approximately 98 mm and an interior height of approximately 20 mm. In that case, the outer diameter of data storage disks 12 would preferably be in the range of 94-96 mm. The outer dimensions or external dimensions of an LTO cartridge may be approximately 105 millimeters by 101 millimeters by 20 millimeters. Cartridge housing 11 may also substantially conform to a DLT cartridge form factor including an interior width of approximately 97 mm and an interior height of approximately 22 mm. In that case, the outer diameter of data storage disks 12 would preferably be between 93-95 mm. The outer dimensions or external dimensions of an DLT cartridge may be approximately 104 millimeters by 104 millimeters by 24 millimeters.

In some cases, cartridge housing 11 may carry data storage disks 12 conforming to a standard data storage disk form factor diameters, such as the standard blue disk media form factor described above. When data storage disks 12 comprise blue disks with an outer diameter between 118-120 mm, cartridge housing 11 may substantially conform to a form factor including an interior width of approximately 122 mm.

As another alternative, conventional 80 mm disks may be used in a cartridge having an inner width or length less than 120 mm. While this may reduce storage capacity because the size of the disk does not utilize the entire available inner space of the cartridge, conventional 80 mm disks are currently available. Thus, in this case, the need to design new optical disk molding equipment for disk fabrication can be avoided by using such 80 mm disks and a cartridge that is not large enough to accept conventional 120 mm disks. Embodiments having 80 mm disks inside an LTO cartridge, DLT cartridges, 9940 cartridges, or other standard cartridges are specifically contemplated.

Standard outer diameter blue disk media with thinner substrate elements may provide justification for a non-standard tape cartridge, especially for a non-tape cartridge library application where compliance with tape cartridge handling systems is not necessary. For example, a standard diameter blue disk may include a thickness of 0.6 mm. If a non-standard data cartridge includes a height of approximately 22 mm and a disk-to-disk spacing of 0.3 mm, the data cartridge could provide the equivalent of 130 DVD quality movies (4.7 GB each) in a smaller than VHS form factor.

Table 3, shown below, provides an example of a non-standard data cartridge housing enclosing Blu-Ray disks with a standard outer diameter of 118 mm and a non-standard thickness of 0.6 mm. Table 3 gives capacities for the non-standard data cartridge when carrying between 18 and 29 Blu-Ray disks comprising 1-layer, 2-layer, 4-layer, or 8-layer constructions. Table 3 also lists the number of DVD quality movies provided by the data cartridge for each number of 1-layer Blu-Ray disks.

TABLE 3

| Disk N | Spacing (mm) | 1-layer (GB) | 2-layer (GB) | 4-layer (GB) | 8-layer (GB) | # DVD movies |
|---|---|---|---|---|---|---|
| 18 | 0.59 | 454 | 908 | 1816 | 3632 | 97 |
| 19 | 0.53 | 479.2 | 958.5 | 1916.9 | 3833.8 | 102 |

TABLE 3-continued

| Disk N | Spacing (mm) | 1-layer (GB) | 2-layer (GB) | 4-layer (GB) | 8-layer (GB) | # DVD movies |
|---|---|---|---|---|---|---|
| 20 | 0.48 | 504.5 | 1008.9 | 2017.8 | 4035.6 | 107 |
| 21 | 0.43 | 529.7 | 1059.3 | 2118.7 | 4237.4 | 113 |
| 22 | 0.38 | 554.9 | 1109.8 | 2219.6 | 4439.2 | 118 |
| 23 | 0.34 | 580.1 | 1160.2 | 2320.5 | 4640.9 | 123 |
| 24 | 0.30 | 605.3 | 1210.7 | 2421.4 | 4842.7 | 129 |
| 25 | 0.27 | 630.6 | 1261.1 | 2522.3 | 5044.5 | 134 |
| 26 | 0.24 | 655.8 | 1311.6 | 2623.1 | 5246.3 | 140 |
| 27 | 0.21 | 681.0 | 1362 | 2724 | 5448.1 | 145 |
| 28 | 0.18 | 706.2 | 1412.5 | 2824.9 | 5649.8 | 150 |
| 29 | 0.15 | 731.5 | 1462.9 | 2925.8 | 5851.6 | 156 |

Data storage disks with a thinner profile than the standard form factor for blue disk media, i.e., 1.2 mm, allows more data surfaces per cartridge. The HD-DVD compatible media may be at least 0.6 mm thick and the absolute limit for the Blu-Ray compatible media thickness is a 0.3 mm molded substrate with a 0.1 mm coversheet for a total media thickness of 0.4 mm. Thinner blue disk media constructions, however, may challenge the mechanical tolerances of the molded substrates for the Blu-Ray format. The blue disk media formats may also incorporate a robust hard-coat, anti-static coating to prevent media handling problems. The improved performance of such a protective layer may enable the disk-to-disk spacing within a cartridge housing to be minimized, which increases the capacity per cartridge regardless of the data storage disk format.

FIGS. 3-6 are plots illustrating data cartridge capacity vs. disk-to-disk spacing within the data cartridge for 1-layer, 2-layer, 4-layer, and 8-layer data storage disks.

Figure 3:
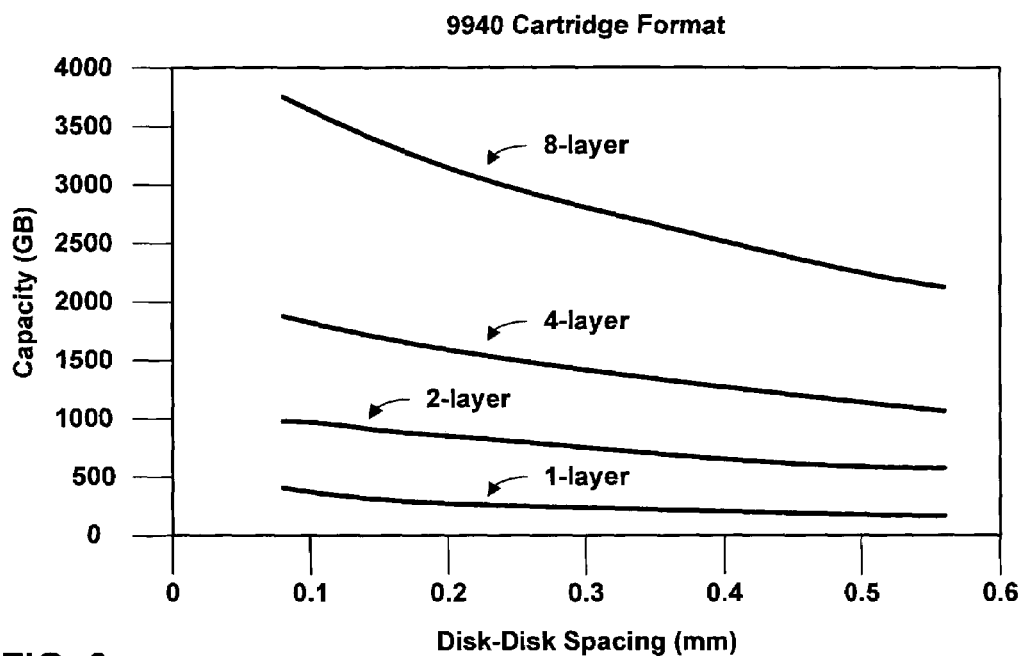
FIGS. 3-6 are plots illustrating data cartridge capacity vs. disk-to-disk spacing within a data cartridge for 1-layer, 2-layer, 4-layer, and 8-layer data storage disks.

FIG. 3 plots the capacity of a 9940 cartridge housing format including a width of approximately 104 mm and a height of approximately 18 mm enclosing a plurality of non-standard Blu-Ray disks with an outer diameter of approximately 100 mm and a thickness of approximately 0.6 mm.

Figure 4:
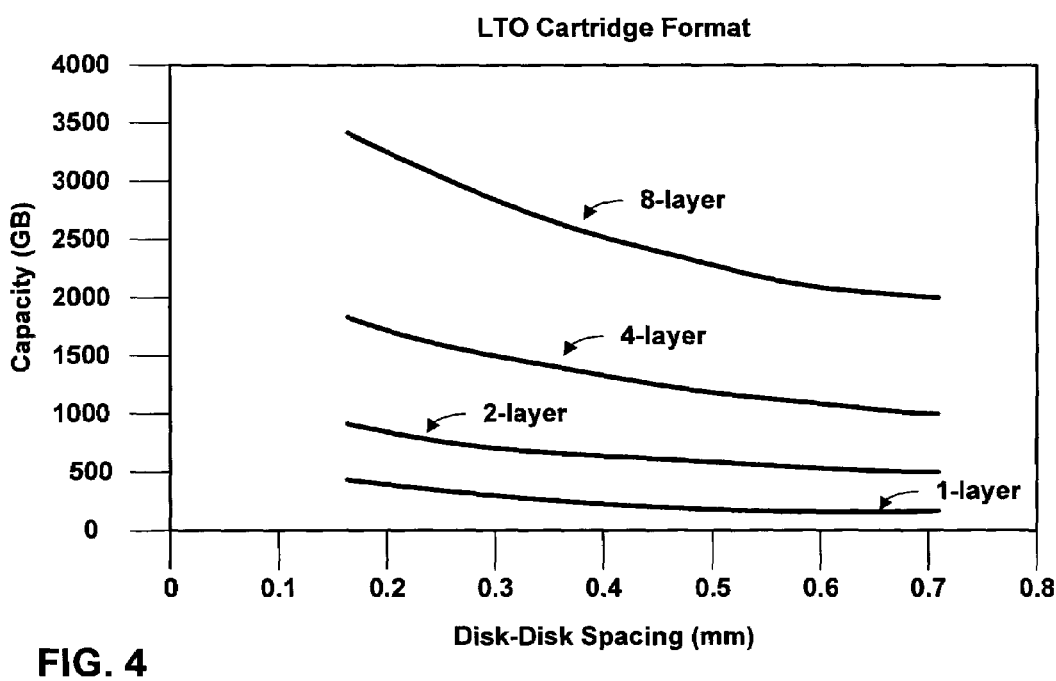

FIG. 4 plots the capacity of a LTO cartridge housing format including a width of approximately 98 mm and a height of approximately 20 mm enclosing a plurality of non-standard Blu-Ray disks with an outer diameter of approximately 96 mm and a thickness of approximately 0.6 mm.

Figure 5:
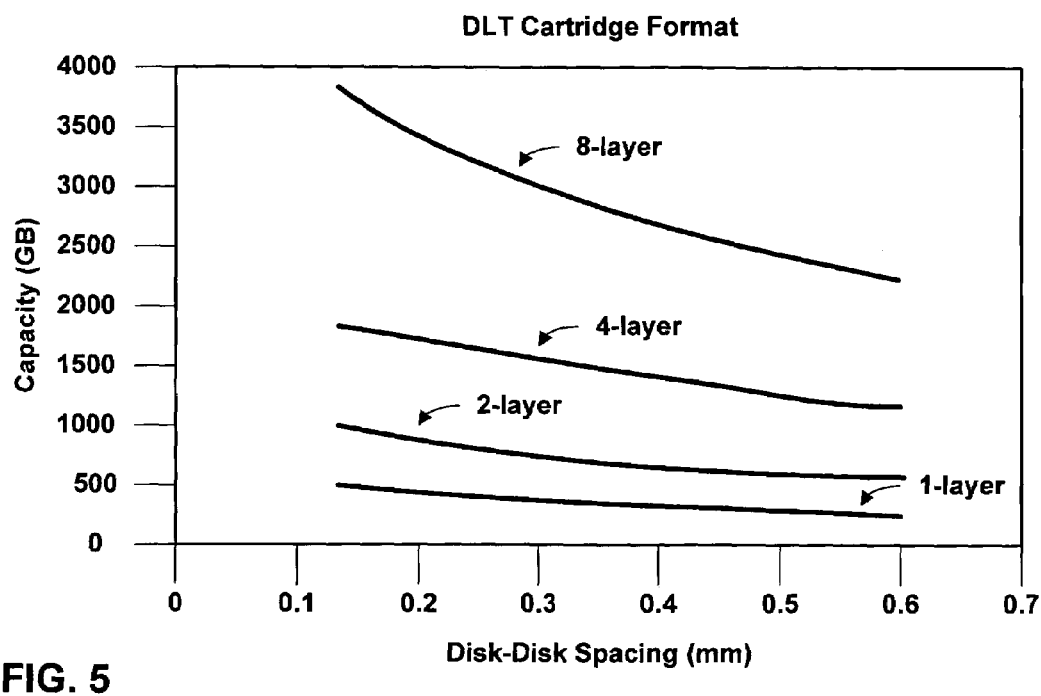

FIG. 5 plots the capacity of a DLT cartridge housing format including a width of approximately 97 mm and a height of approximately 22 mm enclosing a plurality of non-standard Blu-Ray disks with an outer diameter of approximately 95 mm and a thickness of approximately 0.6 mm.

Figure 6:
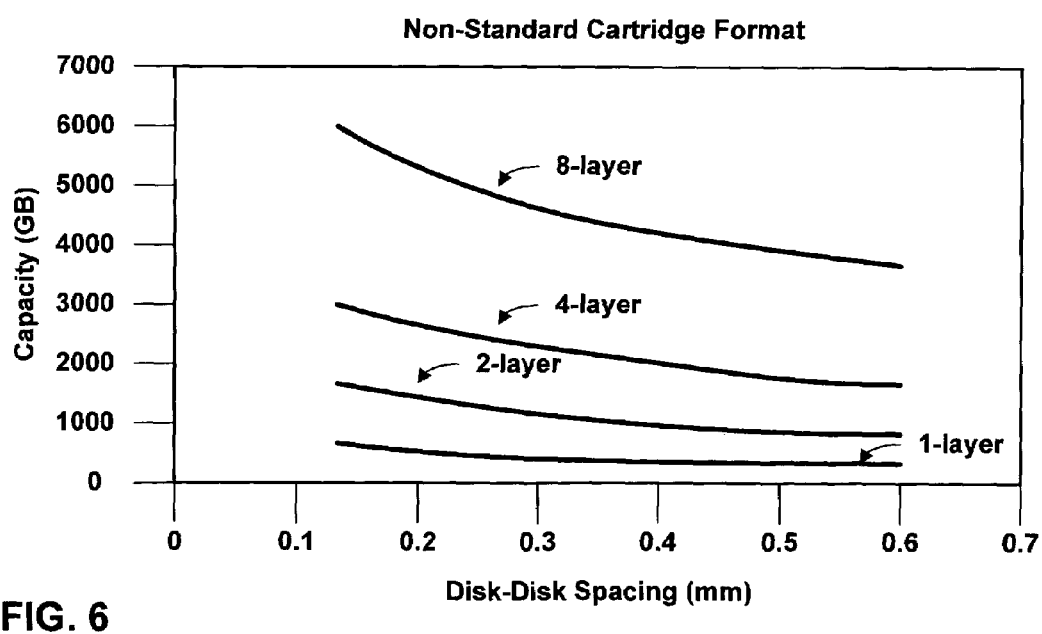

FIG. 6 plots the capacity of a non-standard data cartridge housing format including a width of approximately 122 mm and a height of approximately 22 mm enclosing a plurality of standard diameter Blu-Ray disks with an outer diameter of approximately 118 mm and a thickness of approximately 0.6 mm.

Comparing the plots illustrated in FIGS. 3-6 shows that the standard form factor cartridge housings provide substantially similar capacities. However, the non-standard cartridge housing provides substantially greater capacity than the standard form factor cartridge housings.

Figure 7:
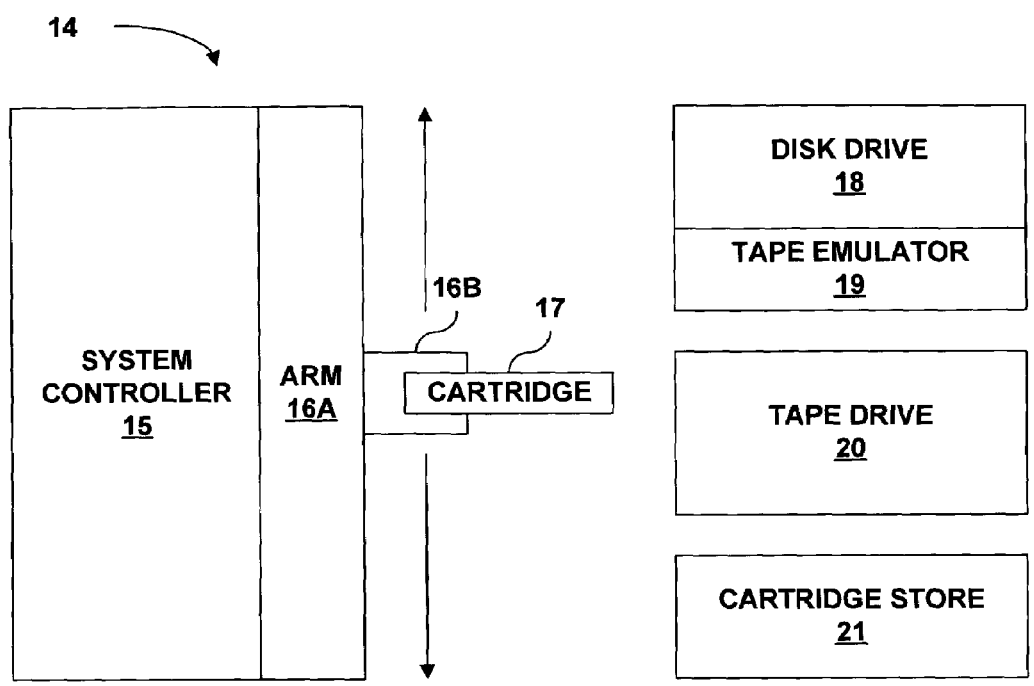
FIG. 7 is a block diagram illustrating an automated data cartridge library system.

FIG. 7 is a block diagram illustrating an automated data cartridge library system 14. System 14 comprises a conventional tape cartridge library system further including a data storage disk drive 18 coupled to a tape drive emulator 19. A system controller 15 selectively retrieves a data cartridge 17 from a cartridge store 21 and loads the retrieved data cartridge 17 into either disk drive 18 or tape drive 20. When the drive is finished with the data cartridge 17, system controller 15 retrieves the data cartridge 17 from the drive and returns it to the assigned storage location within cartridge store 21.

A computing device (not shown) communicates with system controller 15 to direct operation of the data cartridge library system 14. In response to an access request from the computing device, system controller 15 generates control signals to direct a robot arm 16A and a gripper 16B to retrieve the appropriate data cartridge from cartridge store 21 and insert the data cartridge into one of drives 18 or 20. In response to the signals, robotic arm 16A traverses cartridge store 21 and engages a cartridge 17 using gripper 16B. Upon insertion of data cartridge 17 into one of drives 18 or 20, the computing device can write data to, and read data from, the data cartridge.

Cartridge store 21 provides a plurality of data cartridge storage locations. The data cartridges may comprise magnetic tape cartridges for use with tape drive 20 or data storage disk cartridges for use with disk drive 18. The data storage disks may comprise blue disk media, i.e., optical disk media having a data storage capacity greater than approximately 15 GB. The data storage disk cartridges may include a plurality of data storage disk enclosed within the cartridge housing, substantially similar to data cartridge 2 illustrated in FIG. 1.

Regardless of the media type, each data cartridge includes a cartridge housing comprising dimensions that conform to a standard tape cartridge form factor and features for engagement by system controller 15. In addition, the data cartridges may have some type of identifying information, such as a label, a bar code, or a radio frequency (RF) tag, by which the system controller 15 identifies the individual data cartridges. In this way, cartridges housing different types of media can be mechanically indistinguishable by system controller 15. Therefore, the data storage disk cartridges may be backward compatible with automated tape cartridge library system 14 and the mechanical interfaces of system controller 15 need not be adapted or upgraded to support the data storage disk cartridges.

Data storage disk drive 18 may include a tape drive emulator such that the data storage disks appear to the computing device as sequential storage devices. Specifically, tape drive emulator 19 communicates with the computing device as a conventional tape drive. For example, in response to a query from the computing device, tape drive emulator 19 may identify disk drive 18 as a conventional tape drive, such as a standard 9940 tape drive. Consequently, the drivers and other software applications executing on the computing device for accessing tape cartridges need not be modified.

As for the data storage disk cartridges, tape drive emulator 19 may be physically configured for use with conventional backup infrastructure, such as automated tape cartridge library system 14. For example, disk drive 18 and tape drive emulator 19 may conform to a substantially similar dimension and form factor as conventional tape drive 20 and may be readily inserted within a drive bay of automated tape cartridge library system 14. In this manner, data storage disk cartridges physically appear the same as magnetic tape data cartridges from the perspective of system controller 15, and functionally appear the same from the perspective of the computing device.

Figure 8:
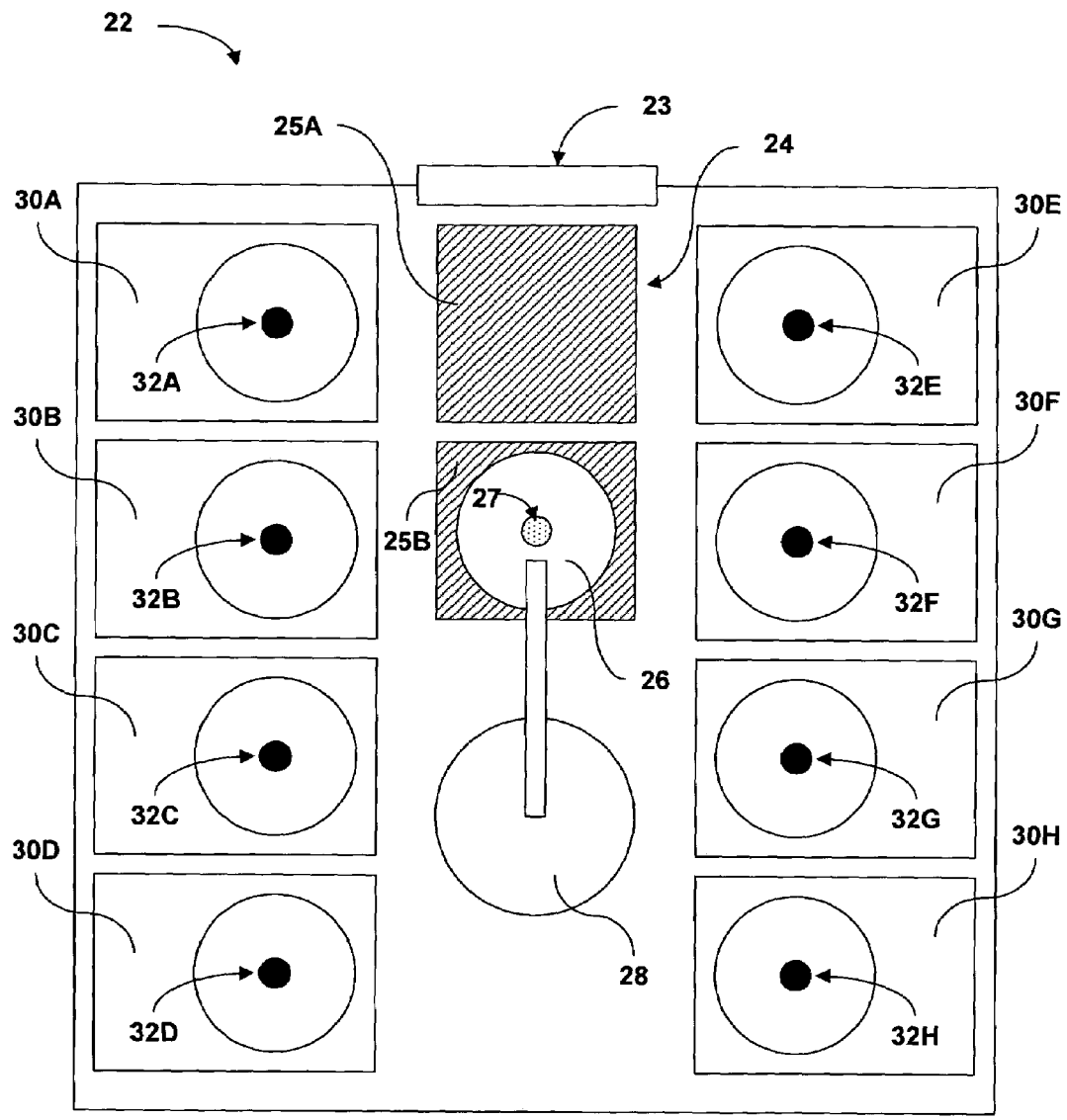
FIG. 8 is a schematic diagram illustrating a data storage disk drive with a plurality of disk drive stations.

FIG. 8 is a schematic diagram illustrating a data storage disk drive 22 with a plurality of disk drive stations 30A-30H ("drive stations 30"). Data storage disk drive 22 may be included in an automated cartridge library system associated with a computing device. In some embodiments, drive 22 may couple to a tape drive emulator and may operate substantially similar to disk drive 18 from FIG. 7. In the illustrated embodiment, drive 22 includes eight drive stations 30. In other embodiments, drive 22 may comprise any number of drive stations 30.

Drive 22 may receive a data cartridge 24 via an aperture 23. Data cartridge 24 comprises a cartridge housing top portion 25A and a cartridge housing bottom portion 25B ("cartridge housing 25"). Bottom portion 25B includes a spindle 27, and a plurality of data storage disks 26 stacked on spindle 27. Aperture 23 may comprise dimensions that substantially conform to a form factor of cartridge housing 25. As described above, cartridge housing 25 may conform to a standard tape cartridge format or a non-standard cartridge format based on a form factor of data storage disks 26.

Upon receiving data cartridge 24, the computing device in which drive 22 is included opens cartridge housing 25 to expose the data storage disks 26. As shown in FIG. 8, cartridge housing top portion 25A is completely removed from spindled data storage disks 26 stacked adjacent cartridge housing bottom portion 25B. In other embodiments, cartridge housing 25 may open in a different manner, such as described in relation to FIGS. 12 and 13.

A transport mechanism 28, e.g., an automated arm, within drive 22 unspindles data storage disks 26 from spindle 27 and positions one of data storage disks 26 onto each of spindles 32A-32H ("spindles 32") at drive stations 30. Each of drive stations 30 may comprise a drive head (not shown) with an objective lens to focus a light onto a surface of the data storage disk 26 in order to read data from the disk or write data to the disk.

In some embodiments, data storage disks 26 may comprise blue disk media with standard thicknesses. A standard Blu-Ray media format includes a 1.1 mm substrate with a 0.1 mm coversheet. In this case, drive stations 30 can be designed with drive heads capable of reading or writing data through the 0.1 mm coversheet. A standard HD-DVD media format includes two 0.6 mm substrates bonded together. In this case, drive stations 30 should be designed with drive heads capable of reading or writing data through the 0.6 mm incident substrate. In other embodiments, data storage disks 26 may comprise blue disk media with non-standard thicknesses. In that case, drive stations 30 can be designed for the non-standard media.

The data access time to the fall capacity of a data storage disk cartridge is dictated by the robotics actuating the disk placement (typically a few seconds) rather than the winding time associate with a conventional tape cartridge (1-3 minutes). In the illustrated embodiment, transport mechanism 28 may place eight of the data storage disks 26 at drive stations 30. Access time to the data stored on the eight data storage disks is typically tens of milliseconds.

Unspindling data storage disks 26 onto the eight drive stations 30, as illustrated, brings a higher fraction of the cartridge capacity to the computing device and provides a higher data rate. The data rate of a multi-station drive is approximately equal to the data rate of the data storage disks times the number of drive stations. For example, when data storage disks 26 comprise Blu-Ray media with 1× data rates, drive 22 may reach a data rate of 36 MB, which is equivalent to a current mid-range tape cartridge. However, when data storage disks 26 comprise Blu-Ray media with 5× data rates, drive 22 may achieve a data rate of 180 MB, which surpasses a current high-end tape cartridge.

Figure 9:
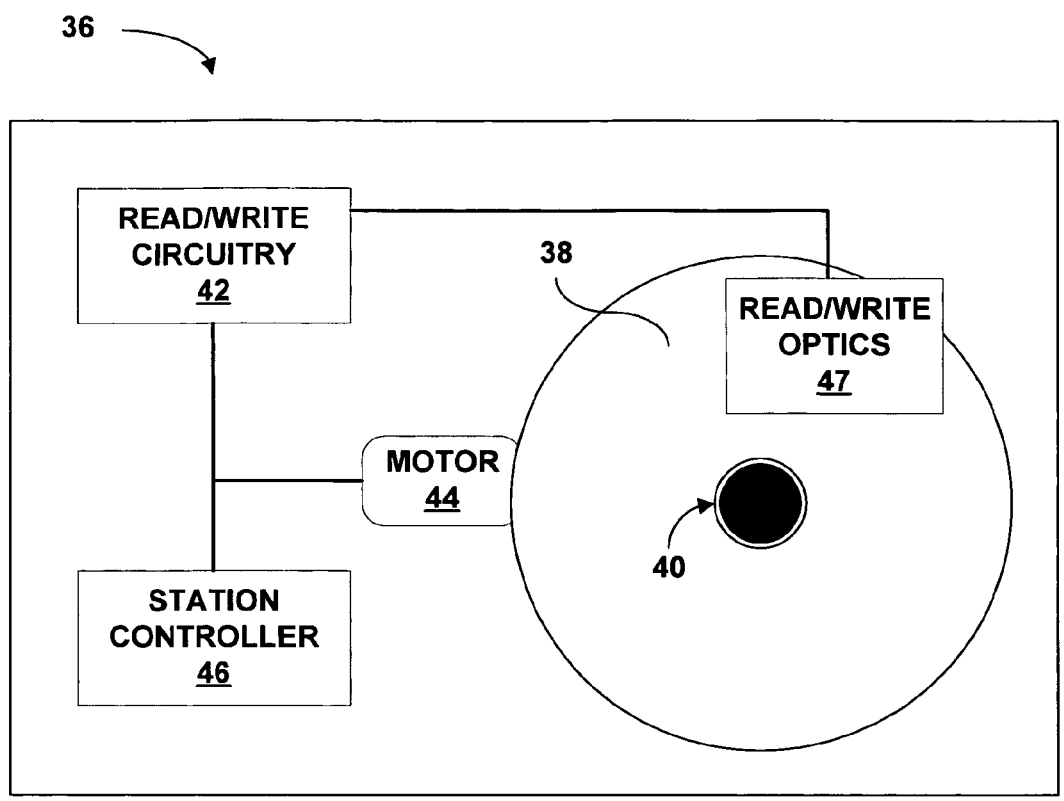
FIG. 9 is a block diagram illustrating an exemplary embodiment of a disk drive station.

FIG. 9 is a block diagram illustrating an exemplary embodiment of a drive station 36. In some embodiments, drive station 36 may be included in a multi-station drive associated with an automated cartridge library system substantially similar to one of drive stations 30 within drive 22 (FIG. 8). In other embodiments, drive station 36 may couple to a tape drive emulator and may operate substantially similar to disk drive 18 from FIG. 7. In still other embodiments, drive station 36 may comprise a fully self-contained data storage disk drive, which may be purchased as an off-the-shelf component from one of a number of blue disk drive manufactures, such as Sony Corporation of Japan.

Drive station 36 includes a data storage disk 38. Upon insertion of a multi-disk cartridge into a computing device in which drive station 36 is included, the computing device may remove data storage disk 38 from the data cartridge and position data storage disk 38 onto a spindle 40 at drive station 36. Drive station 36 includes read/write circuitry 42, a spindle motor 44, a station controller 46, and read/write optics 47. Spindle motor 44 rotates data storage disk 38 around spindle 40. Station controller 46 controls read/write circuitry 42, which in turn positions and controls read/write optics 47 to facilitate optical reading and writing of data to and from data storage disk 38. Read/write optics 47 may include one or more lasers, one or more photosensitive elements, and various optical conditioning elements that facilitate optical data storage and readout.

Read/write optics 47 may comprise a light source and an objective lens to focus the light onto a surface of data storage disk 38. As described above, data storage disk 36 may comprise a blue disk medium with either a 0.1 mm coversheet, i.e., Blu-Ray format, or a 0.6 mm incident substrate, i.e., HD-DVD format. In both cases, read/write optics 47 should be capable of reading or writing data through the cover layer/substrate. In other embodiments, data storage disk 36 may comprise a blue disk medium with a non-standard thickness. For example, data storage disk 36 may comprise a blue disk medium with substrate thickness less than 1.1 mm or less than 0.6 mm. For another example, data storage disk 36 may comprise a blue disk medium without a cover layer. In that case, read/write optics 47 may include a cover layer positioned adjacent the objective lens such that the light may be focused onto the surface of data storage disk 36. The cover layer may be affixed to the objective lens, and may vary in thickness for different embodiments, based on the blue disk format of data storage disk 36.

In any multi-disk cartridge application, the sealed cartridge housing provides an additional degree of environmental protection to the enclosed disks. This is particularly important in the case where data storage disk 36 comprises a blue disk medium without a cover layer. In this case, a sealed data cartridge may protect data storage disk 36 from surface debris issues that conventionally require either a protective coversheet (Blu-Ray format) or an incident substrate (HD-DVD format) media construction. A sealed data cartridge enables a simplified process for manufacturing air incident media, e.g., blue disks without cover layers, while circumventing the largest yield loss step in the blue disk fabrication process. The air incident media construction also lends itself to a higher numerical aperture (NA), Near-Field, and a shorter wavelength systems for future generation optical media.

Figure 10:
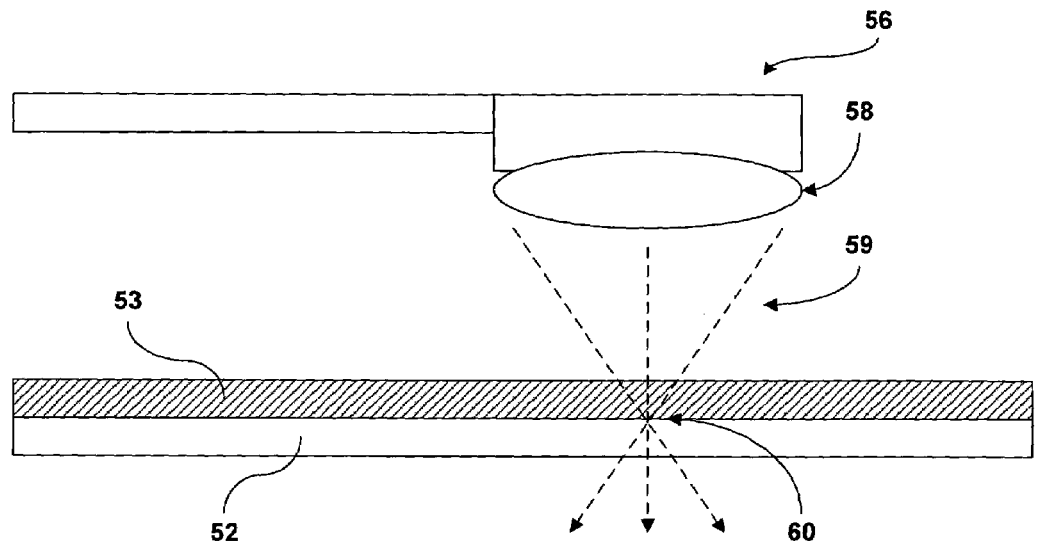
FIG. 10 is a schematic diagram illustrating a drive head for a data storage disk including a cover layer.

FIG. 10 is a schematic diagram illustrating a drive head for a data storage disk 52 including a cover layer 53. In some embodiments, data storage disk 52 may comprise a 1.1 mm Blu-Ray substrate and cover layer 53 may comprise a 0.1 mm coversheet. In other embodiments, data storage disk 52 may comprise a 0.6 mm blank substrate bonded to a 0.6 mm incident HD-DVD substrate 53. In still other embodiments, data storage disk 52 and cover layer 53 may comprise other thicknesses and conform to other formats.

The drive head includes read/write optics 56, which includes an objective lens 58. Read/write optics 56 may operate substantially similar to read/write optics 47 from FIG. 9. Read/write optics 56 may include a light source (not shown) such that objective lens 58 focuses a light 59 from the light source into a focal spot 60 on a surface of data storage disk 52.

Objective lens 58 takes into account cover layer 53 that light 59 passes through before it reaches the recording/readback surface of data storage disk 52. For example, in the case of the Blu-Ray media format, data storage disk 52 is buried beneath a 0.1 mm protective layer 53 which is designed to provide defocusing of surface debris. The 0.1 mm protective layer thickness meets the minimal requirement for adequate defocusing of typical surface debris on Blu-Ray media. The drive head includes a high NA objective lens 58 corrected in its optical design to compensate for the requirement of focusing through 0.1 mm of material 53.

If objective lens 58 were instead used to focus light 59 on a surface of data storage disk 52 without the appropriate thickness of cover layer 53, focal spot 60 would blur due to an optical effect known as spherical aberration. The blurring increases as the mismatch between an actual cover layer thickness and a cover layer thickness presumed by objective lens 58 increases. A tolerance for variation between the actual and presumed cover layer thicknesses significantly tightens as the power of objective lens 58, which is related to the NA, increases. Therefore, a higher NA objective lens used for progressively higher storage density requires tighter tolerances in the cover layer thickness. As a specific example, a Blu-Ray disk in a drive station including an objective lens with NA=0.85 requires a nominal cover layer thickness of 0.1 mm+/−5 µm and allows only a +/−2 µm variation over the Blu-Ray disk thickness from nominal.

Figure 11:
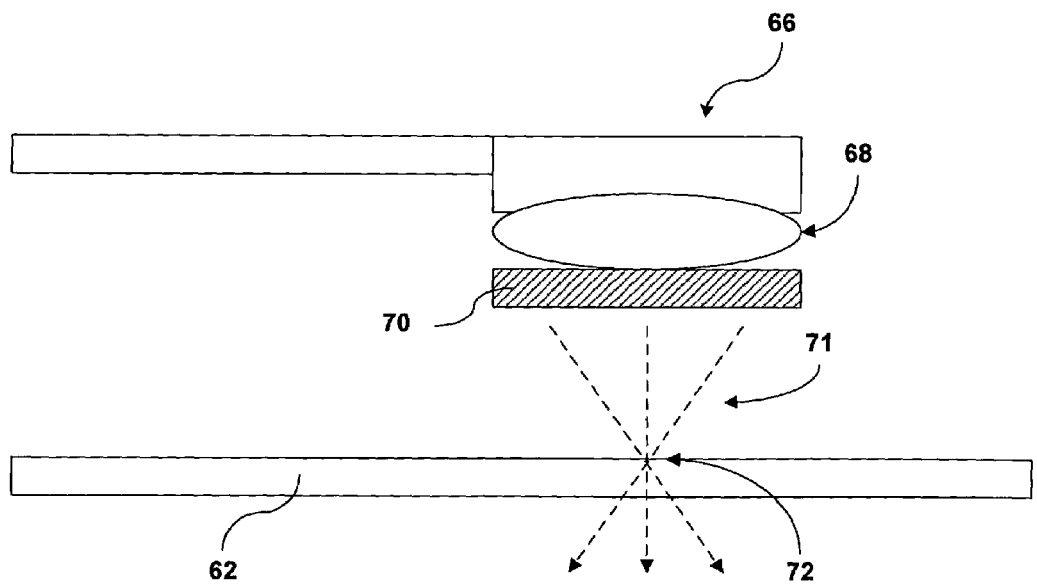
FIG. 11 is a schematic diagram illustrating a drive head for a data storage disk without a cover layer.

FIG. 11 is a schematic diagram illustrating a drive head for a data storage disk 62 without a cover layer. In some embodiments, data storage disk 62 may comprise a 1.1 mm Blu-Ray substrate. In other embodiments, data storage disk 62 may comprise a 0.6 mm HD-DVD substrate. In still other embodiments, data storage disk 62 may comprise other thicknesses and conform to other formats.

The drive head includes read/write optics 66, which comprise an objective lens 68, and a cover layer 70. In particular, cover layer 70 is affixed or otherwise positioned adjacent objective lens 68. Read/write optics 66 may operate substantially similar to read/write optics 47 from FIG. 9. Read/write optics 66 may include a light source (not shown) such that objective lens 68 focuses a light 71 from the light source into a focal spot 72 on a surface of data storage disk 62 via cover layer 70.

An objective lens designed to focus on a data storage disk through a predetermined thickness of cover layer material will form a theoretical 'best' focus after passing though the predetermined thickness of material whether or not the material is adjacent the data storage disk. In the case of data storage disk 62 conforming to a Blu-Ray media format without a cover sheet, cover layer 70 may comprise a thickness of 0.1 mm. In the case of data storage disk 62 conforming to a HD-DVD media format without an incident substrate, cover layer 70 may comprise a thickness of 0.6 mm.

Elimination of the cover layer application step from the blue disk fabrication process removes many uncertainties from the manufacturing yield. For example, current reports for cover layer bonding yields are in the 50%-60% range. A currently available objective lens with an adjacently affixed cover layer of predetermined thickness, as illustrated in FIG. 11, may access a surface of an air-incident blue disk medium. In some cases, a furniture generation objective lens may be capable of accessing a surface of an air-incident blue disk medium without a constrained thickness cover layer.

The air-incident medium can be enclosed within a cartridge housing that remains sealed except when the data cartridge is inside of a controlled environment data storage disk drive, such as drive 22 from FIG. 8. In some cases, an interior of the cartridge housing may include a thin film vapor barrier that provides anti-static protection and additional blockage against moisture vapor transmission through the cartridge housing. The cartridge housing may also include a compliant sealing ring to prevent external debris and or humidity from contaminating the data storage disks when outside of the controlled environment drive.

The air-incident blue disk structure described above lends itself more easily to further generation optical products. For example, as an objective lens NA increases, tolerances on cover layer thicknesses become overly stringent to maintain manufacturing yields. Furthermore, in the event that laser sources with wavelengths less than 405 nm, currently used for Blu-Ray and HD-DVD, become viable, the list of materials suitable to transmit in the ultra-violet (UV)/deep UV (DUV) become very short. An air-incident blue disk medium construction provides a path for these further explorations.

Figure 12:
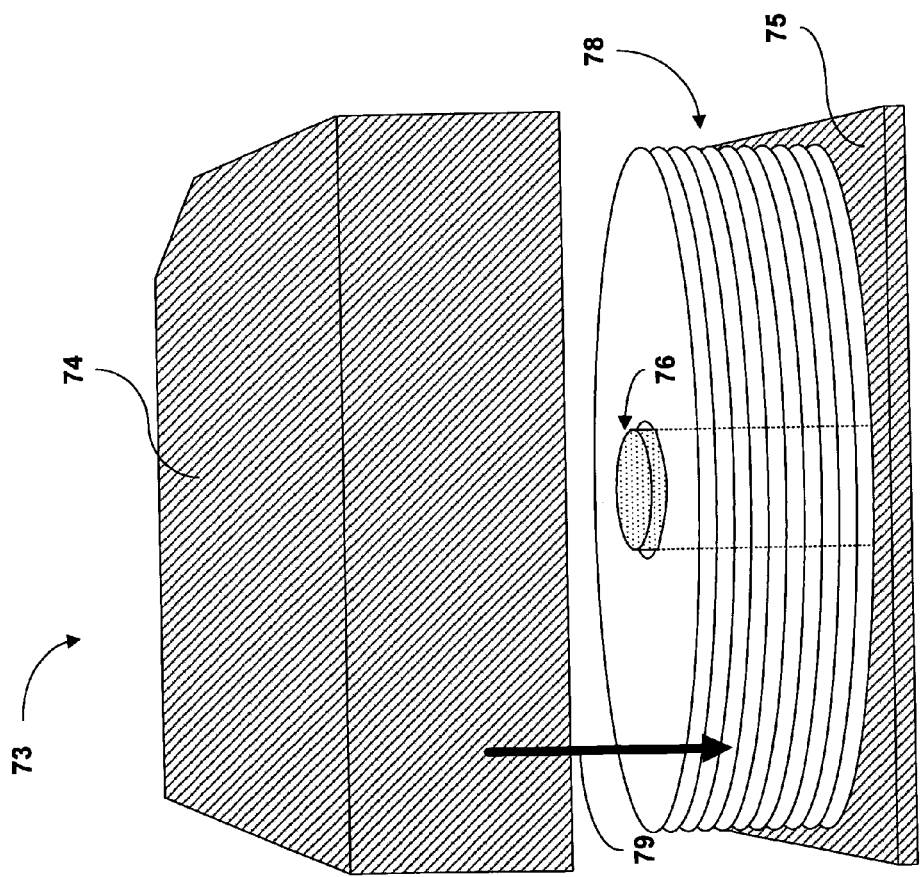
FIG. 12 is a schematic diagram illustrating an exemplary embodiment of a multi-disk data cartridge.

FIG. 12 is a schematic diagram illustrating an exemplary embodiment of a multi-disk data cartridge 73. Data cartridge 73 may operate substantially similar to data cartridge 10 from FIG. 2 and data cartridge 24 from FIG. 8. Data cartridge 73 includes a cartridge housing with a cartridge shell 74 and a cartridge base 75. Cartridge base 75 comprises a spindle 76 on which a plurality of data storage disks 78 are stacked.

Cartridge base 75 may comprise a partial turn lock to seal data storage disks 78 within cartridge shell 74. In other cases, cartridge base 75 or cartridge shell 74 may comprise other locking mechanisms to create a sealed cartridge 73. When data cartridge 73 is inserted into a data storage disk drive of a computing device, such as drive 22 from FIG. 8, the computing device unlocks cartridge base 75 from cartridge shell 74. According to the illustrated embodiment, the computing device may then extract spindled data storage disks 78 from cartridge shell 74 by dropping cartridge base 75 in a direction 79 perpendicular to a major plane of cartridge 73. However, cartridge 73 may be detrimental to maintaining a low form factor drive height because at least two times the thickness of cartridge 73 is required to retract data storage disks 78 stacked on spindle 76.

In the embodiment where data storage disks 78 comprise air-incident blue disks, data storage disks 78 can be enclosed within a cartridge housing that remains sealed except when the data cartridge is inside of a controlled environment data storage disk drive. An interior of cartridge shell 74 may include a thin film vapor barrier that provides anti-static protection and additional blockage against moisture vapor transmission through the cartridge housing. Cartridge base 75 may include a compliant sealing ring that prevents external debris and or humidity from contaminating data storage disks 78 when cartridge 73 is outside of the controlled environment drive.

Figure 13:
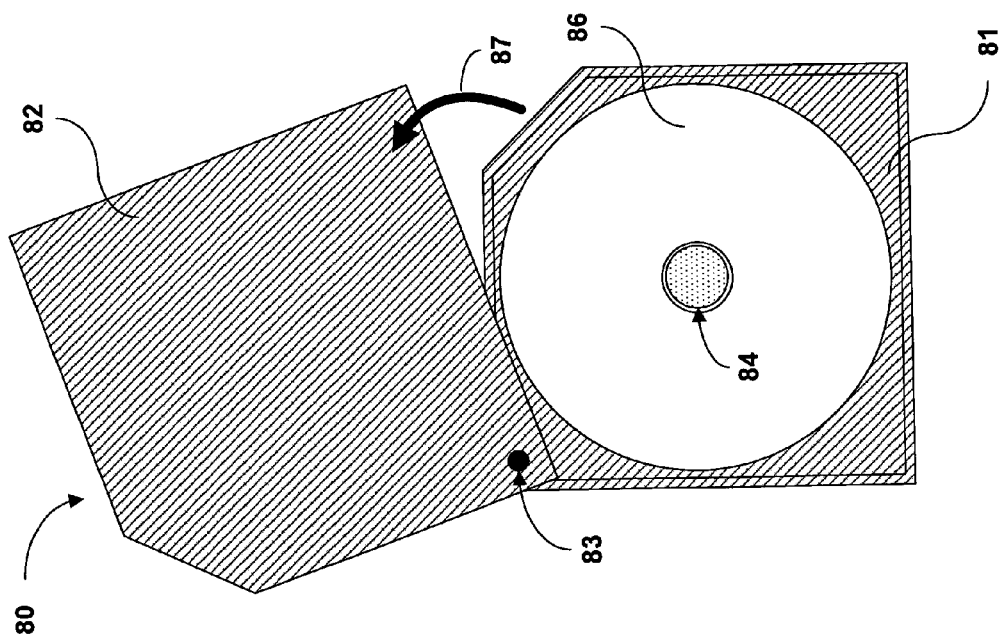
FIG. 13 is a schematic diagram illustrating another exemplary embodiment of a multi-disk data cartridge.

FIG. 13 is a schematic diagram illustrating another exemplary embodiment of a multi-disk data cartridge 80. Data cartridge 80 may operate substantially similar to data cartridge 10 from FIG. 2 and data cartridge 24 from FIG. 8. Data cartridge 80 includes a cartridge housing with a cartridge shell 81 and a cartridge cover 82. Cartridge shell 81 comprises a spindle 84 on which a plurality of data storage disks 86 are stacked.

In the illustrated embodiment, a corner pivot mechanism 83 affixes cartridge cover 82 to cartridge shell 81. In other cases, cartridge cover 82 may couple to cartridge shell 81 in another way to create a sealed cartridge 80. When data cartridge 80 is inserted into a data storage disk drive of a computing device, such as drive 22 from FIG. 8, the computing device pivots cartridge cover 82 in a direction 87 about corner pivot mechanism 83 to expose data storage disks 86. The drive within the computing device may then extract spindled data storage disks 86 from cartridge shell 81. Corner pivot mechanism 83 enables a lower form factor drive because spindled data storage disk 86 may be exposed by pivoting cartridge cover 82 off of cartridge shell 81 within the same plane as the cartridge thickness.

In the embodiment where data storage disks 86 comprise air-incident blue disks, data storage disks 86 can be enclosed within a cartridge housing that remains sealed except when the data cartridge is inside of a controlled environment data storage disk drive. An interior of cartridge shell 81 may include a thin film vapor barrier that provides anti-static protection and additional blockage against moisture vapor transmission through the cartridge housing. Cartridge cover 82 may include a compliant sealing ring that prevents external debris and or humidity from contaminating data storage disks 86 when cartridge 80 is outside of the controlled environment drive.

Various embodiments of the invention have been described. For example, a data cartridge including a plurality of data storage disks has been described for an automated data cartridge library system. In some cases, the multi-disk data cartridge may comprise a cartridge housing conforming to a standard tape cartridge form factor. In other cases, the multi-disk data cartridge may comprise a cartridge housing conforming to a non-standard form factor based on a standard diameter data storage disk. The data storage disk may comprise blue disk media with or without cover layers. While a few examples of standard tape cartridges have been mentioned, such as DLT, 9840, 9940 and LTO, the invention may find application with any of wide variety of other standard format tape cartridges, using optical disks instead of the magnetic tape conventionally used in such cartridges.

Furthermore, a multi-station disk drive has been described that de-cartridges the data storage disks onto the plurality of drive stations. In the case of blue disk media without cover layers, each of the drive stations may comprise an objective lens and a cover layer affixed adjacent the objective lens to focus a light onto a surface of the air-incident blue disk media. Nevertheless various modifications can be made to the techniques described herein without departing from the spirit and scope of the invention. For example, in some cases, multiple disks may be stacked in a cartridge housing without requiring a spindle. For example, the disks may be molded to include features that allow the disks to be stacked without a spindle, or another mechanism may be used to facilitate stacking. These and other embodiments are within the scope of the following claims.

The invention claimed is:

1. A data cartridge comprising:
   a cartridge housing;
   a spindle within the cartridge housing; and a plurality of data storage disks stacked on the spindle in the cartridge housing, wherein the cartridge housing is configured to be opened by a computing device when the data cartridge is inserted into the computing device so that the computing device can unspindle the plurality of data storage disks.

2. The data cartridge of claim 1, wherein the cartridge housing comprises dimensions that substantially conform to a form factor of a cartridge housing standard.

3. The data cartridge of claim 2, wherein the cartridge housing conforms to a 9940 cartridge form factor.

4. The data cartridge of claim 2, wherein the cartridge housing conforms to a linear tape-open (LTO) cartridge form factor.

5. The data cartridge of claim 2, wherein the cartridge housing conforms to a digital linear tape (DLT) cartridge form factor.

6. The data cartridge of claim 1, wherein the disks within the data cartridge collectively define a storage capacity greater than approximately 200 gigabytes.

7. The data cartridge of claim 1, wherein the plurality of data storage disks comprise optical disk media compatible with a blue-laser drive head.

8. The data cartridge of claim 7, wherein the optical disk media compatible with a blue-laser drive head substantially conform to a form factor of a disk standard including a diameter of approximately 120 mm and a thickness of approximately 1.2 mm including a cover layer.

9. The data cartridge of claim 7, wherein the optical disk media compatible with a blue-laser drive head conform to one of a Blu-Ray standard or an HD-DVD standard.

10. The data cartridge of claim 7, wherein the optical disk media compatible with a blue laser drive head substantially conform to a form factor including a diameter between approximately 120 mm and 93 mm and a thickness between approximately 1.2 mm and 0.4 mm.

11. The data cartridge of claim 7, wherein each of the plurality of blue disks do not include a cover layer.

12. The data cartridge of claim 7, wherein the optical disk media compatible with a blue-laser drive head comprise 1-layer, 2-layer, 4-layer, or 8-layer blue disks.

13. The data cartridge of claim 1, wherein the cartridge housing comprises a cartridge shell and a base, wherein the computing device unlocks the cartridge shell from the base and drops the base and the data storage disks out of the cartridge shell.

14. The data cartridge of claim 1, wherein the cartridge housing comprises a cartridge shell and a cover affixed to the cartridge shell via a corner pivot mechanism, wherein the computing device pivots the cover about the corner pivot mechanism to expose the data storage disks stacked within the cartridge shell.

15. A system comprising:
a data cartridge with a cartridge housing that encloses a plurality of optical disk media compatible with a blue-laser drive head, wherein the cartridge housing comprises a spindle and the plurality of optical disk media compatible with a blue-laser drive head are stacked on the spindle;
a computing device that receives the data cartridge and opens the cartridge housing to expose the optical disk media compatible with a blue-laser drive head; and
a plurality of disk drive stations within the computing device, wherein the computing device positions different ones of the optical disk media compatible with a blue-laser drive head in the disk drive stations to read data from the optical disk media compatible with a blue-laser drive head or write data to the optical disk media compatible with a blue-laser drive bead.

16. The system of claim 15, wherein the cartridge housing comprises dimensions that substantially conform to a form factor of a cartridge housing standard.

17. A data cartridge comprising:
a cartridge housing substantially conforming to a form factor of a standard data storage tape cartridge and defining an inner dimension within the cartridge housing less than approximately 120 millimeters that prohibits a 120 millimeter diameter disk from fitting within the housing; and
a plurality of data storage disks stacked in the cartridge housing, the data storage disks having diameters of approximately 80 millimeters and being compatible with a blue-laser drive head, wherein the cartridge housing comprises a spindle and the plurality of disks are stacked on the spindle, and wherein the cartridge housing is configured to be opened by a computing device when the data cartridge is inserted into the computing device so that the computing device can unspindle the plurality of data storage disks.

* * * * *